3,845,045
DIHYDRO-1,2,4-BENZOTHIADIAZINE-1,1-
DIOXIDE DERIVATIVES
Peter Werner Feit, Gentofte, and Ole Bent Tvaermose
Nielsen, Vanlose, Denmark, assignors to Lovens Kemiske Fabrik Produktionsaktieselskab, Ballerup, Denmark
No Drawing. Filed Mar. 8, 1972, Ser. No. 232,963
Claims priority, application Great Britain, Mar. 31, 1971,
8,317/71
Int. Cl. C07d 93/32
U.S. Cl. 260—243 D
4 Claims

ABSTRACT OF THE DISCLOSURE

This invention relates to a series of new compounds, to salts and esters of these compounds and to methods for the preparation of the compounds. The new compounds have the general formula:

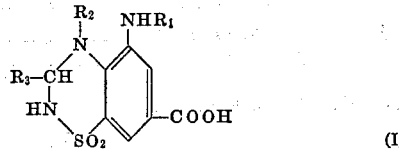

in which $R_1$ represents an alkyl radical having from 3 to 6 carbon atoms or an unsubstituted or substituted benzyl radical; $R_2$ represents an alkyl radical having from 3 to 6 carbon atoms or an unsubstituted or substituted phenyl radical; $R_3$ represents hydrogen, or a lower alkyl radical having from 1 to 6 carbon atoms.

In particular the compounds of formula (I) have a pronounced diuretic and/or saluretic activity.

---

This invention relates to a series of new compounds, to salts and esters of these compounds and to methods for the preparation of the compounds. The new compounds have the general formula:

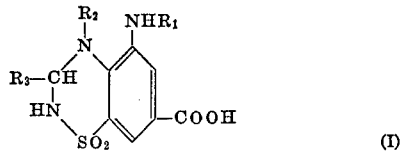

in which $R_1$ represents an alkyl radical having from 3 to 6 carbon atoms or an unsubstituted or substituted benzyl radical; $R_2$ represents an alkyl radical having from 3 to 6 carbon atoms or an unsubstituted or substituted phenyl radical; $R_3$ represents hydrogen, or a lower alkyl radical having from 1 to 6 carbon atoms.

In particular, an alkyl radical may be a straight or branched, unsubstituted or substituted alkyl radical, e.g. a methyl, ethyl, propyl, isopropyl, butyl, isobutyl or tert. butyl radical, or one of the isomeric pentyl or hexyl radicals.

The above mentioned radicals can be substituted with different groups, such as halogen atoms, preferably chlorine or bromine, alkyl groups, halo-alkyl groups, e.g. trifluoromethyl, carboxy and carbalkoxy radicals, carbamyl radicals, di-lower alkyl-amino radicals, hydroxy groups optionally etherified or esterified, or etherified mercapto groups.

The salts of the compounds of the invention are pharmaceutically acceptable salts and include, for example, alkali metal salts, alkaline earth metal salts, the ammonium salt or amine salts formed, for instance from mono-, di- or trialkanolamines or cyclic amines.

The esters of the new compounds are preferably derived from lower aliphatic alcohols, cyanomethanol, and benzylalcohols.

It is known from our earlier inventions that certain substituted 3,4-diamino-5-sulfamyl-benzoic acids possess a rapidly achieved high diuretic and saluretic effect, and the present invention shows that by a ring-closure to the compounds of formula I still a high but more prolonged effect is obtained which may be desirable in the long-term treatment of certain diseases, for instance hypertension and certain edematous offerings.

According to experiments performed on dogs the compounds of the invention are efficacious diuretics. For instance shows a compound of formula I, in which $R_1$ is a benzyl group, $R_2$ is a phenyl group, and $R_3$ is hydrogen, in a dose of 0.1 mg./kg. i.v. a diuretic and saluretic effect over 9 hours similar to the effect obtained within 3 hours by giving the dogs a ten-fold dose, i.e. 1 mg./kg. of the well-known diuretic Furosemide. Furthermore the toxicity of the new compounds is very low and they are not carboanhydrase inhibitors. These facts in connection with a favourable therapeutic index make the compounds particularly valuable.

The present compounds are effective after oral, enteral or parenteral administration and are preferably prescribed in the form of tablets, pills, dragees, or capsules containing the free acid or salts thereof with atoxic bases, or the esters thereof, mixed with carriers and/or auxiliary agents.

Salts, which are soluble in water, may with advantage be administered by injection. The compounds of the invention are useful in the treatment of edematous conditions e.g. cardiac, hepatic, renal, lung and brain edema, or edematous conditions during pregnancy, and of pathological conditions which produce an abnormal retention of the eletrolytes of the body, and in the treatment of hypertension.

The compounds of the invention can be prepared by reacting 3,4-$NR_1N'R_2$-diamino-5-sulfamyl-benzoic acids or esters thereof with an aldehyde $R_3$—CHO or a reactive derivative thereof, such as an acetal, but also other reactive derivatives can be used as well. This ring-closure process is well-known from the preparation of other benzothiadiazines but is in this case very surprising, because o-phenylenediamines usually react with aldehydes and reactive derivatives thereof to form benzimidazoles or benzimidazolines. The process can be performed in water, in inert organic solvents or in aqueous mixtures thereof under neutral or alkaline conditions. If esters are used in the above reaction the free acids of formula I can be obtained by saponification and vice versa, if the free acids are used the esters can be obtained by well-known esterification.

The preparation of the compounds are described more in detail in the following Examples, which are only illustrative and non-limiting:

EXAMPLE 1

5-Benzylamino-4-n-butyl-7-carboxy-2,3-dihydro-1,2,4-benzothiadiazine-1,1-dioxide (a) Sodium 3-Benzylamino-4-n-butylamino-5-sulfamyl-benzoate trihydrate.—3-Benzylamino-4-n-butyl-amino-5-sulfamyl-benzoic acid (5.0 g.) is dissolved in hot 1 N sodium hydrogencarbonate (15 ml.). On cooling, the sodium salt separates as a trihydrate which is collected by filtration and dried in air. After recrystallization from water, the melting point is 73–75° C.

(b) 5-Benzylamino-4-n-butyl-7-carboxy-2,3-dihydro-1,2,4-benzothiadiazine-1,1-dioxide.—A solution of sodium 3-benzylamino-4-n-butylamino-5-sulfamyl-benzoate trihydrate (2.27 g.) and formaldehyde (475 mg. of a 35% aqueous solution) in water (30 ml.) is refluxed for 2 hours. After cooling, the pH of the resulting solution is adjusted to 3 by addition of 1 N hydrochloric acid. The precipitate is collected by filtration and recrystallized from aqueous ethanol to give 5-benzylamino-4-n-butyl-7-carboxy-2,3-dihydro-1,2,4-benzothiadiazine-1,1-dioxide with a melting point of 200–201.5° C.

EXAMPLE 2

5-Benzylamino-7-carboxy-4-phenyl-2,3-dihydro-1,2,4-benzothiadiazine-1,1-dioxide

4-Anilino-3-benzylamino-5-sulfamyl-benzoic acid (1.2 g.) is dissolved in water (15 ml.) by addition of 2 N sodium hydroxide until pH 8. After addition of formaldehyde (350 mg. of an 35% aqueous solution) the reaction mixture is refluxed for 2.5 hours. After cooling, the pH of the resulting solution is adjusted to 2 by addition of 1 N hydrochloric acid. The precipitate is collected by filtration, recrystallized from aqueous ethanol and dried in vacuo at 115° C. for 2 hours to yield 5-benzylamino-7-carboxy-4-phenyl-2,3-dihydro-1,2,4-benzothiadiazine-1,1-dioxide with a melting point of 200 to 201° C.

EXAMPLE 3

5-n-Butylamino-7-carboxy-4-phenyl-2,3-dihydro-1,2,4-benzothiadiazine-1,1-dioxide By replacing in example 2 the 4-anilino-3-n-butylamino-5-sulfamyl-benzoic acid (1.1 g.) for 4-anilino-3-benzylamino-5-sulfamyl-benzoic acid, 5-n-butylamino-7-carboxy-4-phenyl-2,3-dihydro-1,2,4-benzothiadiazine-1,1-dioxide is obtained with a melting point of 213–214° C.

What we claim is:

1. A compound of the class consisting of: compounds of formula I

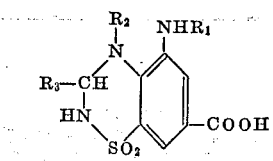

in which $R_1$ represents alkyl having from 3 to 5 carbon atoms, or benzyl; $R_2$ represents alkyl having from 3 to 5 carbon atoms or phenyl; $R_3$ represents hydrogen or methyl; and pharmaceutically acceptable nontoxic salts thereof; and their cyano methyl, benzyl and $C_1$–$C_6$ alkyl esters.

2. A compound as claimed in claim 1, in which $R_1$ is butyl, $R_2$ is phenyl and $R_3$ is hydrogen.
3. A compound as claimed in claim 1, in which $R_1$ is benzyl, $R_2$ is butyl and $R_3$ is hydrogen.
4. A compound as claimed in claim 1, in which $R_1$ is benzyl, $R_2$ is phenyl and $R_3$ is hydrogen or methyl.

References Cited
UNITED STATES PATENTS 3,691,162   9/1972   Yale _____ 260—243 D
3,090,783   5/1963   Yale et al. _____ 260—243 D NICHOLAS S. RIZZO, Primary Examiner U.S. Cl. X.R.

424—246